United States Patent [19]

Takeshita et al.

[11] Patent Number: 5,499,045
[45] Date of Patent: Mar. 12, 1996

[54] IMAGE FORMING APPARATUS WITH OPTICAL ELEMENT SUPPORT STRUCTURE

[75] Inventors: Kenji Takeshita; Nobuo Kanai, both of Toyohashi; Hitoshi Kageyama, Kawasaki, all of Japan

[73] Assignee: Minolta Co., Ltd., Osaka, Japan

[21] Appl. No.: 125,583

[22] Filed: Sep. 23, 1993

[30] Foreign Application Priority Data

Sep. 30, 1992 [JP] Japan ..................... 4-261014

[51] Int. Cl.$^6$ ..................... B41J 2/47
[52] U.S. Cl. ..................... 347/257
[58] Field of Search ..................... 347/257, 256, 347/258, 259, 260

[56] References Cited

U.S. PATENT DOCUMENTS 4,233,612  11/1980  Hirayama et al. .
4,693,548   9/1987  Tsunoi ..................... 347/244
5,157,536  10/1992  Uematsu ..................... 347/257
5,255,115  10/1993  Kikuchi ..................... 347/257

FOREIGN PATENT DOCUMENTS 4-81809  3/1992  Japan .

*Primary Examiner*—Mark J. Reinhart
*Attorney, Agent, or Firm*—Price, Gess & Ubell

[57] ABSTRACT

A plurality of holding members individually hold some of a plurality of lenses in a scanning optical system. A base member holds and connects a plurality of the holding members at predetermined positional relations with rigidity higher than that of the holding member, and is attached to a structural member of an image forming apparatus.

15 Claims, 4 Drawing Sheets

IMAGE FORMING APPARATUS WITH OPTICAL ELEMENT SUPPORT STRUCTURE

BACKGROUND OF THE INVENTION

1. Technical Field of the Invention

The present invention relates to an image forming apparatus which is utilized for copying machines, printers, facsimiles and the like whereby an image is formed in an electrophotographic method, and more particularly, to an image forming apparatus for forming an image by scanning an image forming surface of photoconductor or the like with a deflected optical beam.

2. Description of Related Art

An image forming apparatus of this kind is provided with a scanning optical system which is arranged for scanning an image forming surface by deflecting an optical beam. The scanning optical system is generally combined with a plurality of lenses such as an fθ lens for enabling a deflected optical beam to perform a scanning in uniform velocity, and a cylindrical lens for rectifying surface inclination of a deflector for its normal posture.

When a surface inclination is rectified with a cylindrical lens, it is necessary to bring the cylindrical lens close to a photoconductor on which description will be made hereinafter referring to FIGS. 5 and 6.

As illustrated in FIG. 5, for instance, in the case when the surface of a polygon mirror a which is used as deflector is inclined, if a light receiving point on a bus b is neither before nor behind relative to a conjugate point e, an image point is on an optical axis, and irregularity of pitch, and generation of fuzz are prevented since an optical path A between a cylindrical lens c and the polygon mirror a, and an optical path B between the cylindrical lens c and a photoconductor d are maintained in a conjugate relation.

As shown in FIG. 6, however, when the surface of a polygon mirror a is inclined, and if a light receiving point is either before or behind relative to a conjugate point e, an optical beam f reflected by the polygon mirror a passes a position deviated by $l_1$ from a bus b at a conjugate point e. An image is therefore formed at a position deviated by $l_2$ from the bus b on a photoconductor d to cause irregularity of pitch and generation of fuzz.

The relation between $l_1$ and $l_2$ is $1/f=1/A+1/B$, and is $l_1:l_2=A:B$. When let $B/A$ equals $\beta$, $l_2=l_1\beta$. For restraining the irregularity of pitch, $l_2$ needs to be lessened. In other words, either $l_1$ or $\beta$ has to be lessened. $l_1$ equals $t \sin \alpha$ (where t is determined by the amount of movement of deflection point, distance between the axis and surface of polygon mirror, and the number of surfaces, and $\alpha$ is the amount of surface inclination). In order to lessen $l_1$, the amount of surface inclination needs to be lessened. More particularly, it is necessary to process the surface of polygon mirror in high accuracy which eventually causes a rise in manufacturing cost. Since there is a limit to a the accuracy in manufacturing process, it is not suitable for a beam scanning operation in high resolution. On the other hand, if $\beta$ is lessened, i.e. a magnification in subscanning direction is lessened, the cylindrical lens is brought closer to the photoconductor as the magnification lessens.

The scanning optical system has heretofore been installed in a housing when it is attached to a structural member of the main body of an image forming apparatus. However, if the cylindrical lens c is brought closer to the photodonductor d as described above, the cylindrical lens c is largely separated from the polygon mirror a.

The scanning optical system thus becomes large in size in the above-mentioned conventional method of installation, and a housing in which the scanning optical system is installed eventually becomes large in size. If the housing becomes large in size, the rigidity as well as the accuracy in overall dimension and shape of the housing are lowered in the conventional manufacturing process, and it becomes difficult to accurately assemble the scanning optical system since it affects postures and, positional relationships of a plurality of lenses to be installed in the scanning optical system.

In recent years, it has been practiced to manufacture a housing of a scanning optical system with resin material in order to lower manufacturing cost, however, it becomes more difficult to accurately manufacture the housing since the rigidity of the housing is further lowered.

In order to solve such problems, it may be considered to separately hold a plurality of lenses in individual housings, and install each one of the divided housings at a predetermined position on a structural member of the main body of an image forming apparatus.

In Published Unexamined Utility Model Application No. 4-20060, there is disclosed an image forming apparatus with a construction as described above. In this apparatus, however, a plurality of lenses are simply attached to individual housings fixed on a structural member of the image forming apparatus without giving any consideration to the rigidity of the structural member. The structural member of the main body of the image forming apparatus itself thus lacks sufficient rigidity, and it eventually affects the postures and positional relationships of a plurality of lenses to invite insufficient accuracy. Further, it may cause to generate image noise since each one of the lenses disposed at different positions is affected by vibration which is generated in the main body. When a plurality of lenses are separated from the main body of an image forming apparatus, it is difficult to control optical accuracy in a scanning optical system.

SUMMARY OF THE INVENTION

A primary object of the present invention is to provide an image forming apparatus which is capable of solving the above-described problems inherent in the conventional apparatus.

Another object of the present invention is to provide an image forming apparatus which is capable of coping with a case even if the size of a scanning optical system becomes large.

A further object of the present invention is to provide an image forming apparatus which is capable of sufficiently meeting a requirement by adopting a lens holding member made of resin at a low cost.

These and other objects and features of the present invention will become more apparent from the following description taken in conjunction with the accompanying drawings which illustrate specific embodiments of the invention.

DESCRIPTION OF THE PREFERRED EMBODIMENT

An embodiment of the present invention will be described hereinafter referring to FIGS. 1 through 4.

Figure 1:
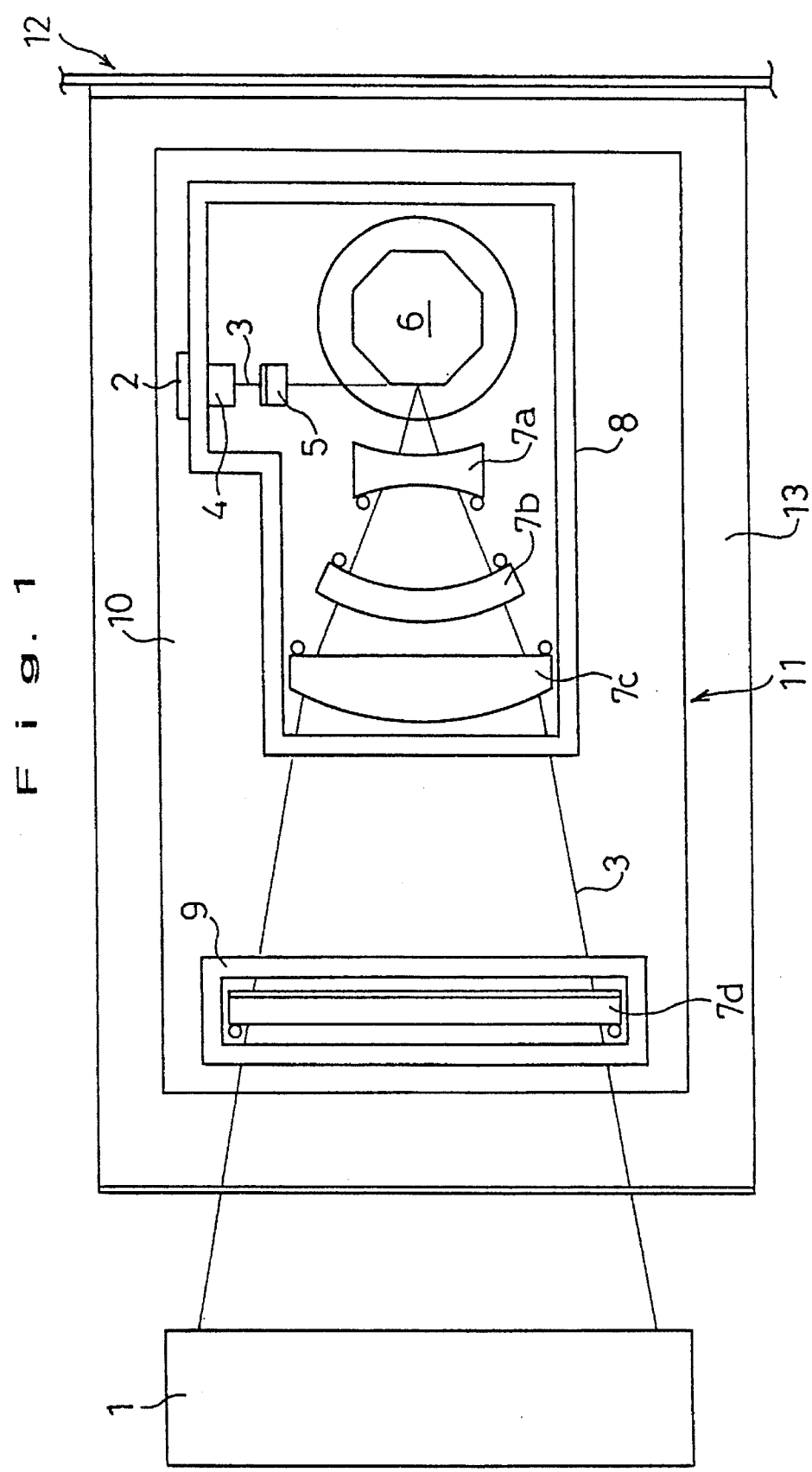
FIG. 1 is a top plan view showing a main part of an optical beam recording apparatus to which the present invention is applied.
Figure 2:
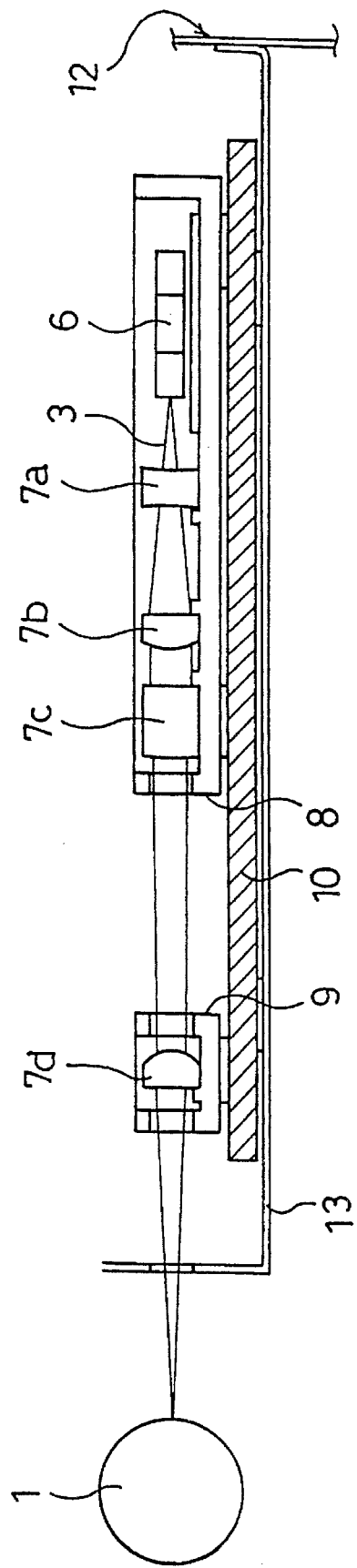
FIG. 2 is a side view showing the apparatus of the FIG. 1.

FIGS. 1 and 2 show a scanning optical system and a photoconductor in an optical beam image forming apparatus to which the present invention is applied.

The photoconductor 1 forms an electrostatic latent image on its uniformly charged surface by receiving an image exposure. The electrostatic latent image is then developed with toner to make it into a toner image, and the toner image is transferred onto a transfer sheet to finally form an image.

In a scanning optical system 11 for conducting an image exposure, a laser beam 3 which is modulated corresponding to an image signal transmitted to a semiconductor laser 2 is made into parallel rays by a collimator lens 4, and is then converged through a cylindrical lens 5. The converged laser beam 3 is then deflected when it enters the surface of reflection of a rotating polygon mirror 6. Thereafter, the laser beam 3 deflected by the polygon mirror 6 is led to the photoconductor 1 through scanning lenses 7a–7d for providing uniform scanning in the axial direction of the photoconductor 1.

A scanning by the scanning optical system 11 performs a main scanning, and a subscanning is performed by the movement of the photoconductor 1 in the direction of its rotation to form a latent image on the surface of the photoconductor 1 corresponding to an image signal.

In the scanning optical system 11, the elements extending from the semiconductor laser 2 to the scanning lens 7c are fixed in a housing 8, while the scanning lens 7d is fixed in another housing 9. The scanning lens 7d is a cylindrical lens provided for rectifying a surface inclination of the polygon mirror 6, and is disposed close to the photoconductor 1 because of the reason as described above in order to cope with a situation that the photoconductor is far separated from the scanning lens 7c. The scanning lens 7d is therefore positioned closest to an image forming surface.

The sizes of each one of the housings 8 and 9 can thus be minimized corresponding to required optical elements to be fixed therein irrespective of a construction that the scanning lens 7d is far separated from other elements. Even if the housings 8 and 9 are manufactured using resin material, the rigidity can be maintained sufficient enough to fix optical elements at adequate positional relationships and postures. Moreover, they can be manufactured at inexpensive cost since the size of the housings can be minimized. The resin material composed of polycarbonate resin mixed with glass material may preferably be utilized. Not limiting to such a material, various kinds of other resign materials may be adopted. Metal material may also be utilized depending on circumstances.

Each of the housings 8 and 9 is positioned by unillustrated positioning means, and is fixed on a base member 10 to thereby maintain predetermined positional relationships and postures. The scanning optical system 11 is arranged to be equipped with the main body 12 of the image forming apparatus by attaching the base member 10 to a structural member 13 to which the scanning optical system 11 of the main body 12 of the image forming apparatus is attached.

Since the base member 10 is manufactured with higher rigidity than the structural member 13, and the housings 8 and 9 possess sufficient rigidity, the housings 8 and 9 and optical elements extending from the semiconductor laser 2 to the scanning lens 7c, as well as the scanning lens 7d can be fixed in high accurate positional relationships and postures. Accurate image forming operations can therefore be accomplished without being affected by the vibration caused by low rigidity of the structural member 13.

Though the scanning optical system 11 is divided into two housings 8 and 9, optical accuracy can be easily controlled as one scanning optical system 11 since they are fixed on one base member 10. The scanning optical system 11 can be removed from the main body 12 of the image forming apparatus, and it can conveniently be handled as a single part.

Figure 3:
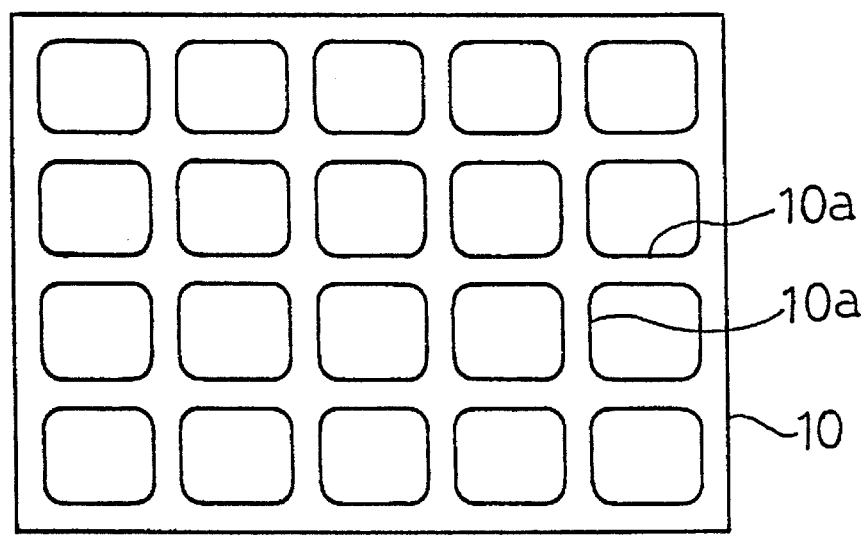
FIG. 3 is an under surface view concretely showing a base member of a scanning optical system utilized in/the apparatus of FIG. 1.
Figure 4:
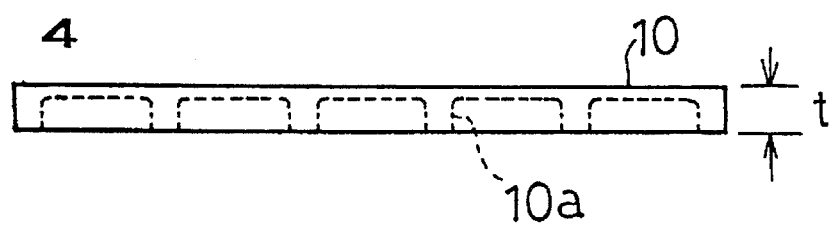
FIG. 4 is a sectional view showing the base member of FIG. 3.
Figure 5:
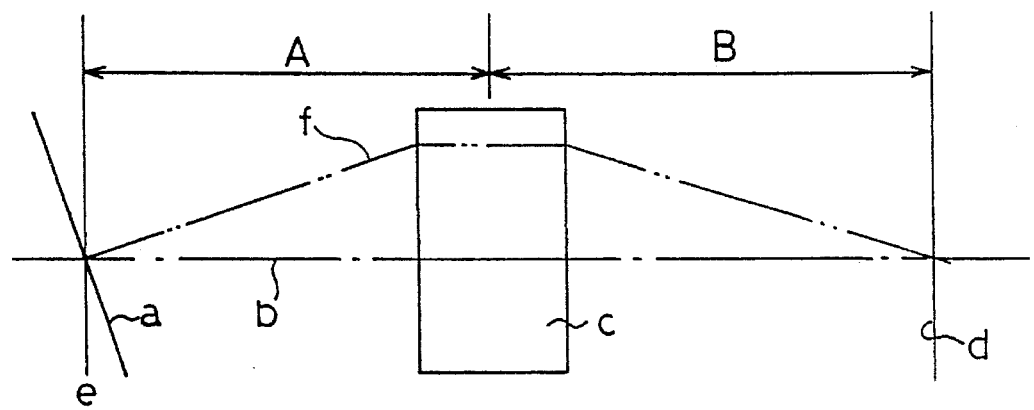
FIG. 5 is an explanatory view showing a case when a cylindrical lens in a scanning optical system rectify surface inclination.
Figure 6:
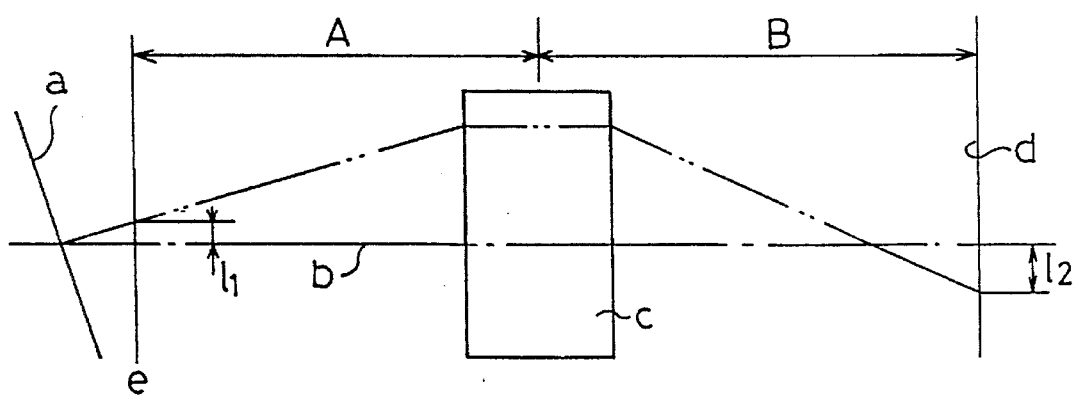
FIG. 6 is an explanatory view showing a case when a cylindrical lens in a scanning optical system rectify surface inclination taking account of a movement of light receiving surface on a polygon mirror.

The structural member 13 is made of steel, however, the base member 10 may preferably be manufactured using aluminum or aluminum alloy. As shown in FIGS. 3 and 4, the rigidity of the base member can be improved by making the thickness t larger or reinforcing it with ribs 10a to form a honeycomb-like cell structure. The same material used for the structural member 13 may also be adopted.

The present invention can effectively be applied to a case when a plurality of lenses in a scanning optical system need to be separately disposed for some reason. When the lenses need to be largely separated, they may be separately fixed in an individual holding member not limiting the number of the holding members to be separated.

Although the present invention has been fully described by way of examples with reference o the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image forming apparatus, comprising:

a light source for generating a beam;

deflecting means for deflecting a beam emitted from the light source and scanning an image forming surface;

a plurality of lenses provided between the deflecting means and an image forming surface on an optical path of a beam for forming an image of the beam on the image forming surface;

a first member on which a lens positioned closest to the image forming surface among said plurality of lenses is fixed;

a second member on which a lens positioned closest to the deflecting means among said plurality of lenses is fixed; and a base member for connecting the first member with the second member, the rigidity of the base member being higher than that of the first member and second member.

2. An image forming apparatus as claimed in claim 1, wherein said first member and second member are made of resin material, and said base member is made of metal.

3. An image forming apparatus as claimed in claim 1, wherein said second member holds the light source and deflecting means.

4. An image forming apparatus as claimed in claim 1, wherein a lens fixed by the first member is a cylindrical lens for rectifying a surface inclination of the deflecting means.

5. An image forming apparatus, comprising:

a light source for generating a beam;

a polygon mirror for deflecting a beam emitted from the light source and scanning an image forming surface;

a plurality of lenses provided between the deflecting means and image forming surface on an optical path of a beam for forming an image of the beam on the image forming surface, one of the plurality of lenses being a cylindrical lens provided for converging the beam in the direction of the axis of rotation of the polygon mirror to rectify a surface inclination of the polygon mirror;

a first member on which said cylindrical lens is fixed;

a second member for holding said polygon mirror; and a base member for connecting the first member with the second member, said base member being higher in rigidity than that of the first member and second member.

6. An image forming apparatus as claimed in claim 5, wherein said first member and second member are made of resin material, and said base member is made of metal.

7. An image forming apparatus as claimed in claim 5, wherein said second member holds said light source and lenses other than the cylindrical lens.

8. An image forming apparatus as claimed in claim 2 wherein said base member includes ribs extending from the base member to increase its rigidity.

9. An image forming apparatus as claimed in claim 8 wherein said ribs of said base member form a honeycomb cell rib structure.

10. An image forming apparatus as claimed in claim 9 wherein said first member is mounted on one end of said base member and said second member is mounted on a second end of said base member spaced from the first member.

11. An improved optical scanning support assembly for an image forming apparatus having an image forming surface comprising:

a first resin housing member;

a light source for generating a beam mounted on the first housing member;

a polygon mirror for deflecting a beam emitted from the light source and scanning the image forming surface operatively mounted within the first housing member;

a plurality of lenses provided on the first housing member for forming an image of the beam on the image forming surface;

a second resin housing member;

a cylindrical lens provided for converging the beam in the direction of the axis of rotation of the polygon mirror to rectify a surface inclination of the polygon mirror mounted in the second housing member, the first and second housing members being formed from approximately the same resin material having approximately the same rigidity characteristics; and a third metal housing member configured with a base member and ribs extending therefrom to increase its rigidity and mounting the respective first and second housing members so that the second housing member is spaced from the first housing member and is positioned adjacent the image forming surface.

12. The invention of claim 11 wherein the first and second housing members are composed of a polycarbonate resin.

13. The invention of claim 12 wherein the polycarbonate resin is mixed with glass material.

14. The invention of claim 11 wherein the third metal housing member is manufactured of aluminum or an aluminum alloy.

15. The invention of claim 11 wherein the image forming apparatus further includes a housing structural member and the third metal housing member is mounted on the housing structural member.

* * * * *